United States Patent [19]
Compton

[11] Patent Number: 5,289,911
[45] Date of Patent: Mar. 1, 1994

[54] MATERIAL SLINGER

[76] Inventor: Ira Compton, 2434 Dayton Rd., Chico, Calif. 95928

[21] Appl. No.: 5,094

[22] Filed: Jan. 15, 1993

[51] Int. Cl.$^5$ .............................................. B65G 31/00
[52] U.S. Cl. ..................... 198/641; 198/638; 414/141.8
[58] Field of Search .................. 198/638, 641, 564; 239/668, 669; 414/140.8, 140.9, 141.8, 142.1, 142.2, 143.1

[56] References Cited

U.S. PATENT DOCUMENTS

| | | | |
|---|---|---|---|
| 1,442,521 | 1/1923 | Case | 414/141.8 X |
| 1,576,366 | 3/1926 | Schieldrop | 198/638 X |
| 1,852,385 | 4/1932 | Weigert | 414/141.8 X |
| 2,125,088 | 6/1938 | Sinden | 414/141.8 X |
| 2,950,808 | 8/1960 | Gerberich | 198/564 |
| 2,950,809 | 8/1960 | Sinden | 198/638 X |
| 3,136,405 | 6/1964 | Kulla | 198/638 X |
| 3,179,235 | 4/1965 | Lucas | 198/638 X |
| 3,332,534 | 7/1967 | Mills | 198/641 X |
| 4,144,962 | 3/1979 | Ide | 198/641 |
| 4,820,108 | 4/1989 | Kneer | 198/641 X |

FOREIGN PATENT DOCUMENTS

| | | | |
|---|---|---|---|
| 0400227 | 12/1969 | Australia | 414/141.8 |
| 0520137 | 11/1953 | France | 198/641 |

Primary Examiner—James R. Bidwell

[57] ABSTRACT

The material slinger includes an upper section with feed hopper suitable for rotatably connecting to a vertically disposed feed chute or tube. Affixed below the feed hopper is a pivotal main body which can be repositioned to alter the angle of the dispensed material. The material is fed from the feed hopper to a funnel shaped hopper in the main body where it is directed onto the curved surface of a high speed rotating throwing belt. The belt, along with the positionable main body, allows the material to be thrown a significant distance and at a wide range of readily changed angles. Also included is an air vent located between the feed hopper and funnel hopper which allows free circulation of air into and or out of the material feed path. The air vent serves as a pressure relief and a vacuum preventing arrangement depending upon the circumstances of material flow.

3 Claims, 5 Drawing Sheets

MATERIAL SLINGER

BACKGROUND OF THE INVENTION

1. Field of the Invention

This invention relates to a motor-powered material throwing or slinging apparatus useful in distributing loose bulk material such as grain, wood chips, powders and the like into areas such as under overhangs or into interior corners of a ship's hull or warehouse. My invention is directed towards a high volume material slinger which can quickly alter the angle of the ejected material without stopping the throwing or altering the tension or alignment of the material throwing belt. Also included is an air vent which allows free circulation of air into and or out of the material feed path to prevent possible air locks which might otherwise slow the feeding of material to the throwing belt.

2. Description of the Prior Art

Material slingers, throwers or trimmers as they are known in the field, fall into a relatively old and well developed art. One prior art disclosure pertaining to material slingers which is particularly useful in gaining an understanding of the basic structures and concepts relating to material slingers is U.S. Pat. No. 2,125,088 issued to A.D. Sinden on Jul. 26, 1938 and herein incorporated by reference. U.S. Pat. No. 2,125,088 is also helpful in understanding the basic mechanics used to rotationally connect a slinger to a vertically hanging tubular feed chute, and spin or rotate the slinger under motor power to direct the throwing of material during the loading of a ship. Other methods and structures for rotatably hanging and spinning slingers on feed chutes, belts or tubes are also known. Another particularly relevant prior art disclosure is U.S. Pat. No. 2,950,809 issued to A. D. Sinden on Aug. 30, 1960 and which is also incorporated herein by reference primarily because of the discussion of throwing belt support and tracking problems associated with material slingers. Another U.S. Pat. No. 2,950,808 issued to D. E. Gerberich on Aug. 30, 1960 is also helpful in understanding throwing belt support, tracking and tensioning in material slingers, and therefore is also incorporated herein by reference.

The majority of material slingers are used for trimming the holds of ships, with some being used for adding capacity to warehouses and extending existing outdoor stockpiles. The function of these material slingers is to eject bulk material at high speed and extended distances into areas that otherwise would be difficult to access. Most of these material slingers utilize a wide, high speed rotating continuous belt for throwing the material to the desired location, which may be many feet from the ejection point. It is necessary to occasionally change the angle (trajectory), upward or downward, at which the material is thrown in order to better access certain areas. Many prior art material slingers change the curvature of the belt from which the material is ejected to alter the angle of projection, that is, throw the material at a higher or lower angle. This is generally accomplished by depressing the top central surface of the belt with two idler wheels, one idler wheel placed on each outer edge of the top surface of the belt. Retracting the idler wheels decreases the curvature of the belt and ejects the material more horizontally, while increasing the curvature of the belt ejects the material in a more upward arch. The main material throwing belt of a slinger is normally supported by a rotatable front wheel and a rotatable rear wheel, with each belt support wheel supported by an axle. The throwing belt is wrapped around the front and rear support wheels, and one of the support wheels or the axle thereof is rotationally driven by an electric motor, which causes the throwing belt to rotate. The axles supporting the belt support wheels must be in near perfect parallel alignment with one another in order for the belt to track in the center of the belt support wheels and to not wander to one side. In order to alter the curve of the throwing belt to change to trajectory of the ejected material as is common in the prior art, facilities must be provided to allow the belt support wheels and axles to either move closer or further from one another as the idler wheels are adjusted upward or downward on the top of the throwing belt, and this most often leads to the tension of the belt being altered, and additionally also normally leads to the wheel support axles becoming slightly out of parallel with one another, thus leading to belt wandering. Thus the disadvantage of this method of altering the ejecting angle of the thrown material is that keeping the throwing belt tracking properly can be very difficult, and altering the tension and curvature of the belt can often throw it out of alignment causing the belt to wander to one side. If the belt wanders, it can become damaged and ruined when it collides with side frame members of the slinger, and there is a significant amount of down time and cost involved in replacing a belt of this nature. A throwing belt can wander to one side and be ruined within just a couple of seconds of running time, which usually does not give the operator time to shut down the machine before the very expensive belt has been damaged.

Another problem associated with prior art slingers is, and most likely always will be, the volume of material which can be moved in a given amount of time. When loading ships, the faster the loading job can be accomplished, the sooner the ship can get underway, which can equate to more loads per year being delivered and possibly higher profits. Therefore there exists the need for an improved arrangement of altering the angle at which the material is ejected from slingers, and further for higher volume slingers which are readily controllable during operation.

SUMMARY

The present invention is an improved material slinger which includes an upper section which has a feed hopper positioned for receiving material such as wood chips from a feed chute or tube in an open top end thereof, the feed chute in turn receives the material from a stockpile as those skilled in the art will recognize and understand the mechanics thereof. My feed hopper, which is positioned below the material feed chute or tube, is preferably rotatably attached to the material feed chute or tube with the rotational attachment including power equipment (motor) and remote controls to allow spinning of the feed hopper and the equipment attached to and below the feed hopper, as is common in the prior art. Preferably the feed hopper is arranged to be able to be rotated 360 degrees about a circle. Pivotally attached to the feed hopper, and generally positioned below the feed hopper, is a main body of the present invention which includes a rigid frame or superstructure which is pivotally connected to the feed hopper. The frame which may pivot upward and downward relative to the feed hopper supports a funnel shaped hopper positioned generally below the feed hopper. The funnel hopper receives material from the bottom discharge opening of the feed hopper and directs and concentrates dry loose bulk material from the feed hopper onto an endless throwing belt positioned to receive material from a lower or bottom discharge opening of the funnel hopper. During operation, the throwing belt is rotating at such a high speed that the bulk material is ejected from the slinger a significant distance. The endless throwing belt, the belt support wheels, the idler wheels, and the belt drive motor are all also supported by the pivotal frame. The front top edge of the funnel hopper is pivotally affixed adjacent to the front bottom edge of the feed hopper with the open upper portion of the funnel hopper sized for sliding or telescoping over the lower open section of the feed hopper, and sufficient space is provided between the two members to allow for a pivotal or angular change between the feed and funnel hoppers. Pivoting of the frame and the equipment supported thereby, such as the funnel hopper and the throwing belt, relative to the feed hopper is powered by at least one lineal extendable actuator shaft positioned adjacent the main pivot at the connection of the feed hopper and frame or funnel hopper. The lineal extendable actuator shaft(s) are remotely controllable either by wire or radio signal controls, and thus the pivotal changes to effect the angle of the thrown material may be made quickly while the material is being thrown. This pivoting action of the frame, funnel hopper and throwing belt relative to the rotatable feed hopper repositions the discharge opening adjacent the throwing belt upward or downward, allowing alteration in the angle of the ejected dry material. The ability of the main body of my material slinger to pivot upward or downward relative to the feed hopper in order to reposition the angle at which the material is discharged eliminates the need for the belt tension and alignment to be altered on the belt support wheels. Once the throwing belt is set in position, tensioned and tracking properly on the belt support wheels and axles, which is usually done at the factory, it need not be adjusted again until the throwing belt needs replacement due to normal wear. Not having to make minor adjustments in the throwing belt when the disbursement angle of the material is changed greatly decreases the chances the belt will become damaged due to misalignment or incorrect tension.

Another feature of my invention includes an opening or air vent, preferably located between the feed hopper and the funnel hopper, which allows free circulation of air into and or out of the material feed flow path. The air vent serves as a pressure relief and a vacuum preventing arrangement depending upon varying circumstances of material flow, and is believed to be quite important in that vertically disposed feed chutes or tubes, or even the feed hopper itself when passing material particularly when being initially filled with material must allow for the rapid displacement of air with the incoming material, whether the material is wood chips or grain or dry powders. The air vent also helps prevent a vacuum effect from being created when a large quantity of dry material is quickly discharged or pulled from the narrower mouth of the funnel hopper by the throwing belt.

Other objects and advantages of my invention will become apparent from a consideration of the following detailed specification, claims, and drawings.

DESCRIPTION OF A PREFERRED EMBODIMENT

Figure 1:
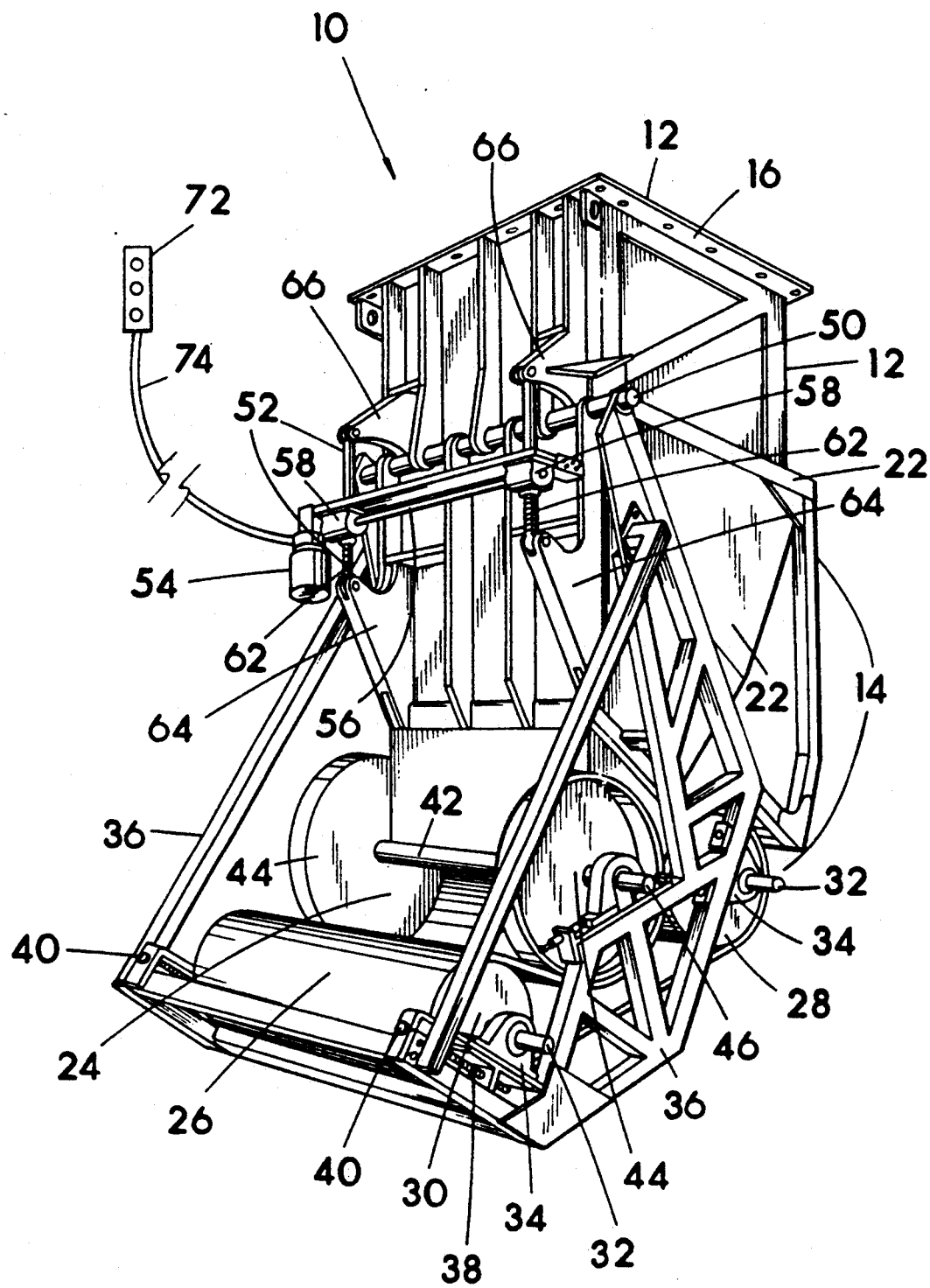
FIG. 1 is a front perspective view of one preferred structural embodiment of the present invention shown for example.
Figure 2:
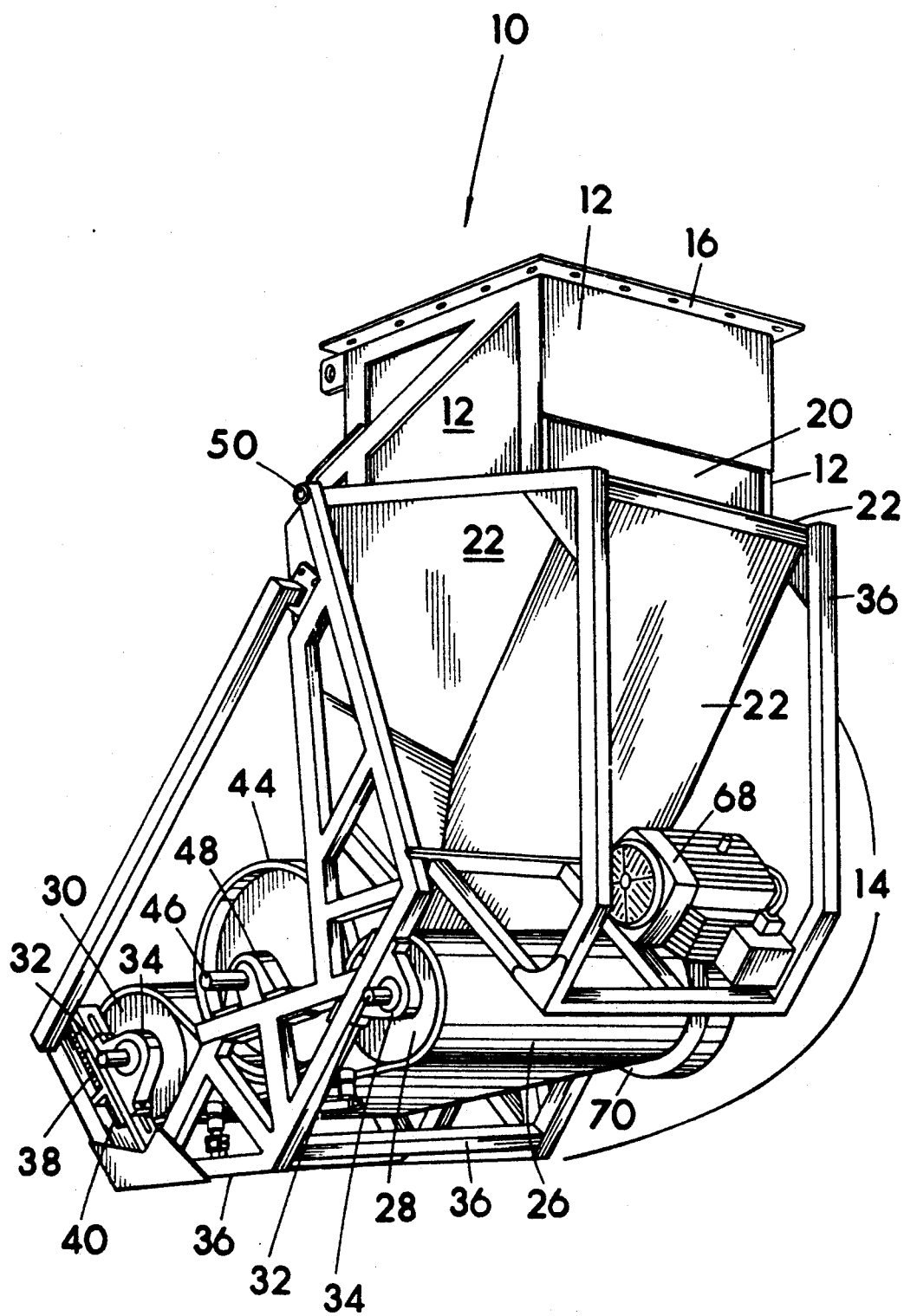
FIG. 2 is a rear view thereof with the air vent shown in the bottom rear section of the feed hopper, between the feed hopper and the top edge of the funnel hopper.

The following description of the present invention is given for example only, with briefness in mind. It should be understood that many alterations may be made from that described and shown in the drawings without departing from the true scope of the invention as depicted in the appended claims. Referring now to the drawings where an embodiment of the present invention is illustrated for example. Material slinger 10 has an upper section including a feed hopper 12 and attachment flange 16. A main body 14 is pivotally attached to the upper section. Feed hopper 12 in this example is a rectangular housing having an open top end rimmed with attachment flange 16 for releasable affixment to a material dispensing source such as the distal end of a material feed chute having powered rotating hardware for spinning the slinger as is common in the prior art. Attachment flange 16 can also be attached to a support frame for suspending it off the ground where the open top end can be fed material 18 from a conveyor belt, auger or the like. Feed hopper 12 also has an open bottom end, to allow passage of material 18 to main body 14, and specifically into funnel hopper 22. Material 18 can include almost any dry loose bulk material such as grains, nuts, wood chips, ash coal or fertilizers. As shown in FIG. 2, the lower bottom edge of the back side of feed hopper 12 is substantially open to form air vent 20, which allows passage of air into and out of the material feed path. Air vent 20 has been found to provide for the faster and more even flowing of material into feed hopper 12, and from feed hopper 12 into funnel hopper 22. Main body 14 includes funnel hopper 22, the upper portion of which is rectangular in shape and sized for insertion over the lower portion of feed hopper 12. The back surface and lower section of both sides of funnel hopper 22 angle inward and downward, narrowing into discharge opening 24. As may be ascertained from the drawings, funnel hopper 22 is sized and position in a manner so as to catch any material which might fall through air vent 20 of feed hopper 12. Discharge opening 24 of funnel hopper 22 exits onto the depressed or recessed surface of throwing belt 26. Belt 26 is a continuous one piece endless loop of rubbery belting which is supported by two spaced apart elongated cylindrical wheels or rollers, drive roller 28 and idler roller 30. Each roller 28 and 30 is affixed stationary to axles 32, one axle per roller. Axles 32 are endwardly supported by bearing blocks 34 on frame 36. Frame 36 is preferably comprised of tubular metal members endwardly connected to provide support for funnel hopper 22, and rollers 28 and 30. The tracking and tension of belt 26 can be adjusted by repositioning idler roller 30 through tracking adjustment member 38, best shown in FIG. 1 and 2, which supports both bearing blocks 34 supporting idler roller 30. Tracking adjustment member 38 includes an elongated rectangular metal plate having a short perpendicular bracket affixed to the bottom surface through which a threaded shaft, or tracking adjustment rod 40, is inserted. The bearing block 34 rests on a stationary, longitudinally grooved plate endwardly affixed to frame 36 with bolts extending from bearing block 34, through the elongated groove to the elongated adjustable plate below. Nuts are threadably affixed to the distal ends of the bolts to secure them in position, and also allow for repositioning and removal of bearing blocks 34 when necessary. Tracking adjustment rod 40 is inserted through an aperture in frame 36, and is threadably secured on the opposite end to a bolt connected to an aperture in the perpendicular plate on the bottom of the elongated adjustable plate. When the bolts are loosened which secure bearing blocks 34, the head of tracking adjustment rod 40 can be rotated which advances or extends the elongated adjustable plate, thus either tightening or loosening belt 26, and also being useful for bringing the two axles 32 into parallel alignment. Both bearing blocks 34 supporting idle roller 30 can be adjusted independent of one another for adjusting the tracking of belt 26.

Drive roller 28 is affixed stationary to axle 32 which is rotatably endwardly affixed to two bearing blocks 34, also releasably affixed to frame 36 with bolts and nuts.

The top surface of belt 26 is formed into a concave depression 42 into which material 18 is deposited from discharge opening 24 at the bottom end of funnel hopper 22. Depression 42 is created by two spaced apart idler wheels 44, which are located on the outer edges of the top surface of belt 26, between both rollers 28 and 30. Idler wheels 44 depress the top of belt 26, forcing it downward into a curved surface or concave depression 42. Both wheels 44 are affixed stationary to each end of a rotatable axle 46 and rotate together by way of frictional engagement with the rotating belt 26. The terminal ends of axle 46 are supported by bearing blocks 48 which are releasably connected to frame 36 with nuts and bolts.

The lower front surface of feed hopper 12 is pivotally affixed to main body 14 by pivotal pin 50 which is supported by vertical metal strengthening ribs, several of which are located on the front surface of feed hopper 12 and the front surface of funnel hopper 22. Pivoting of main body 14 is effected by two linear extendable actuators 52, both powered by a reversible electric angle change motor 54. The two linear extendable actuators 52 are attached to the side of the machine having the main pivot or hinge at 50, although they could be placed on the opposite side of the machine adjacent air vent 20, however a quicker angular change response is obtainable if the actuators 52 are kept near the pivot 50 since a shorter travel in the actuators 52 results in a greater angular or pivotal change between feed hopper 12 and main body 14. Motor 54 drives a horizontal linkage shaft 56 which is affixed with two differential gear boxes 58 through which the actuators 52 extend. Each actuator 52 includes a tubular interior threaded housing retaining an exterior threaded rod 62 which is rotatable by a differential gear box 58, which extends or retracts actuator 52 depending upon the direction of rotation of motor 54, and pivoting main body 14. Threaded rod 62 is endwardly pivotally affixed to mounting bracket 64 which is affixed to the front surface of funnel hopper 22, with the opposite end of actuator 52 pivotally affixed to mounting bracket 66 which is affixed to the front lower surface of feed hopper 12. The on/off controls and reversing or rotation direction controls 72 for motor 54 may be wired as shown at 74 or radio signal controlled, and should be positioned or positionable remote so as to allow the operator of the slinger to control the pivoting from a substantial distance such as on the deck of a ship.

Figure 4:
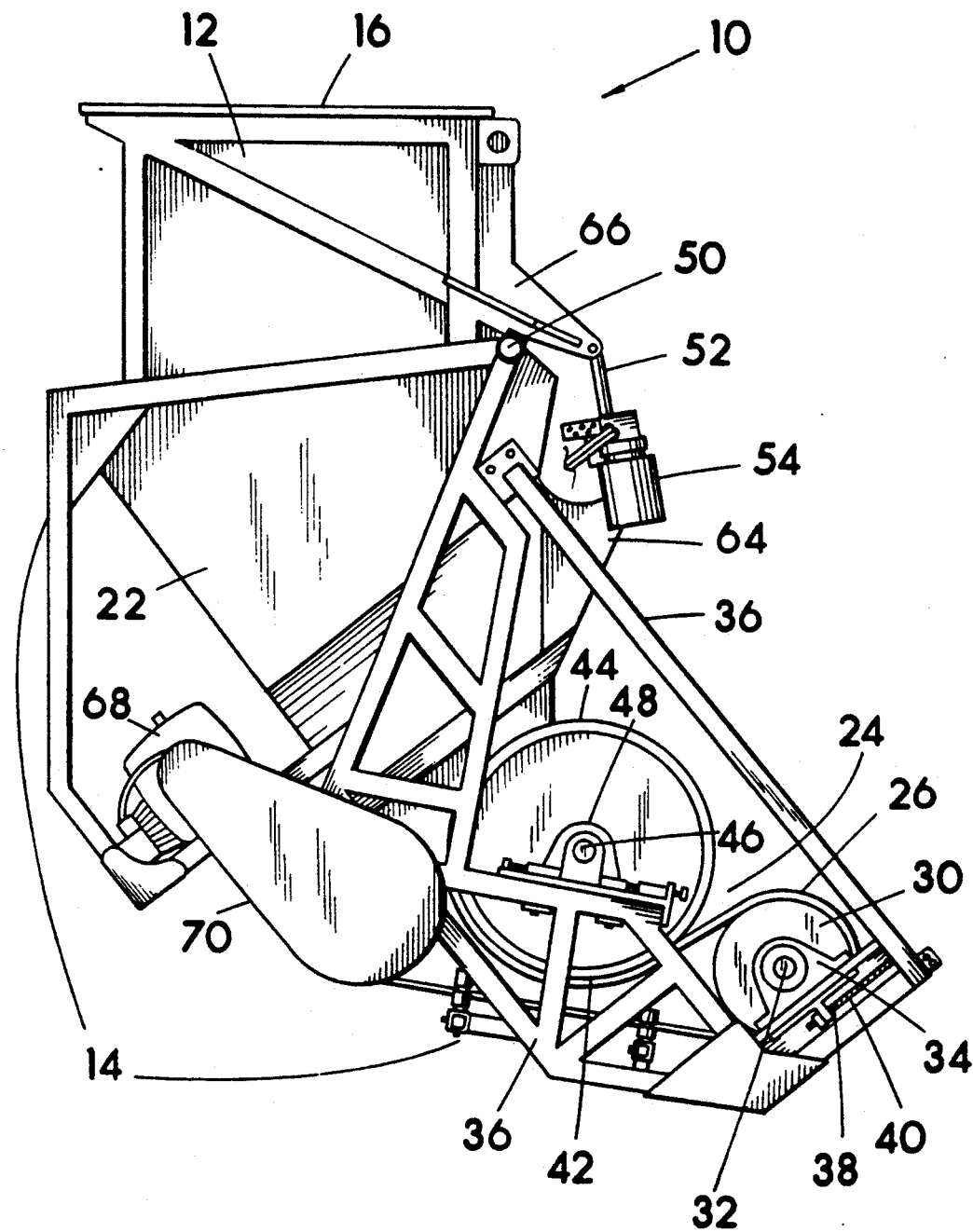
FIG. 4 is a right side view thereof.

Drive roller 28 is powered by electric motor 68 which is located behind funnel hopper 22, affixed to frame 36. Drive roller 28 is connected by a drive belt and pulleys which are shown covered by a shroud in FIG. 4, to electric motor 68.

Figure 3:
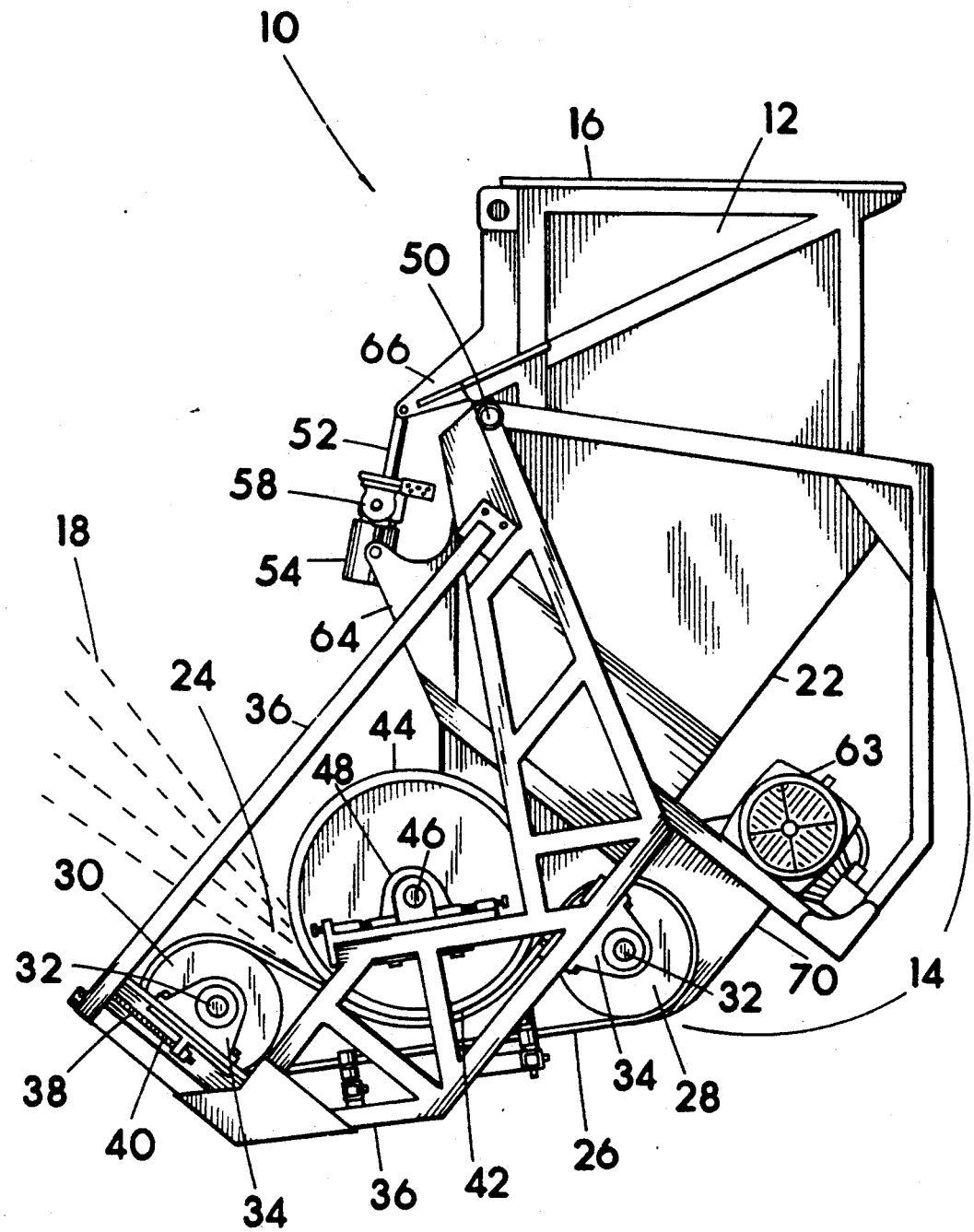
FIG. 3 is a left side view thereof, with the dotted lines representing the dispensed material; the main body of the material slinger is pivoted forward, dispensing the dry material in an upward angle.
Figure 5:
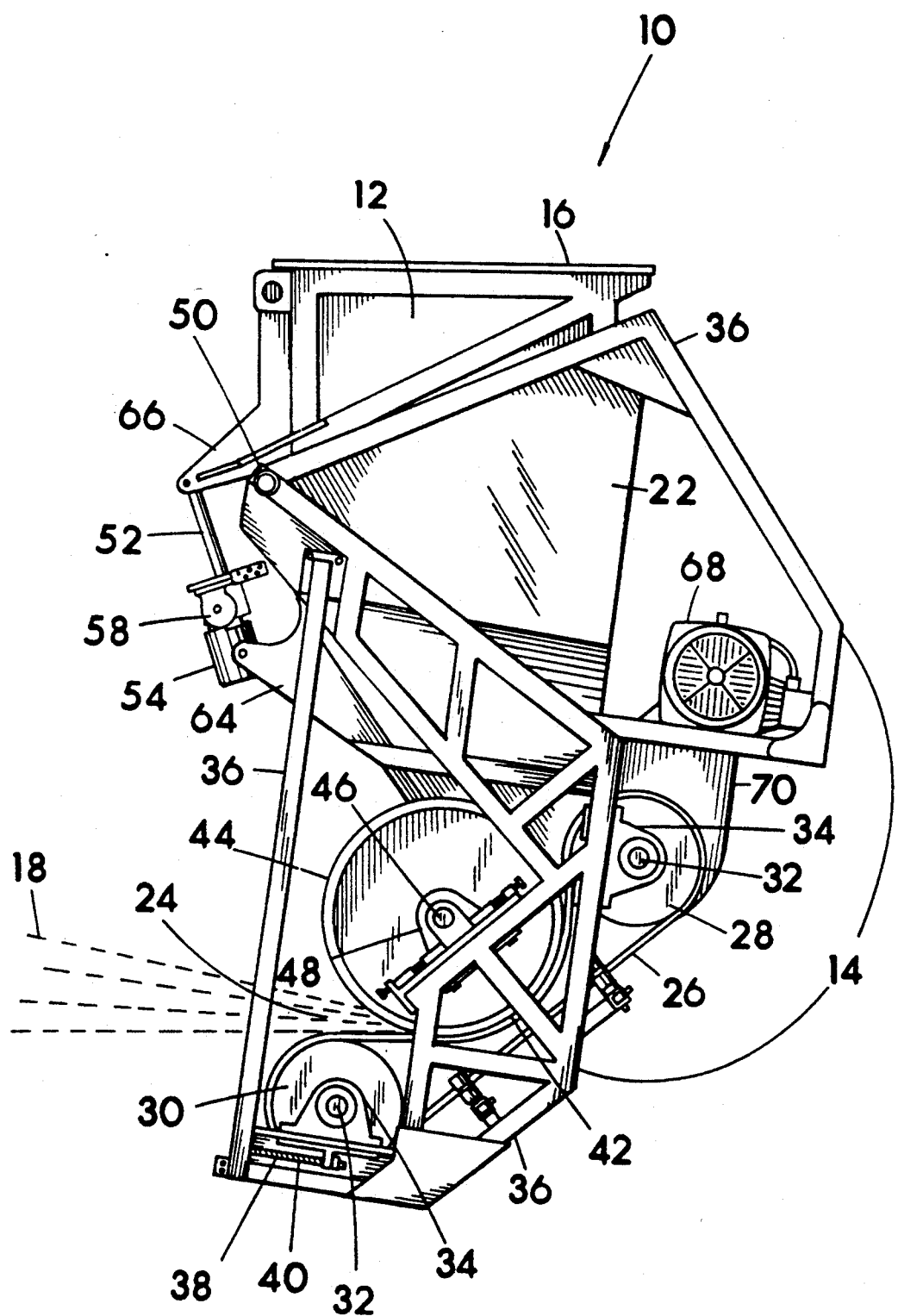
FIG. 5 is a left side view of the material slinger showing the main body pivoted back to discharge the material at a more horizontal angle than FIG. 3.

When in use, material slinger 10 is supported onto a ground supported frame or suspended from the distal end of a discharge chute, neither of which are shown, by attachment flange 16, preferably with the use of nuts and bolts. When material slinger 10 is attached to a ground supported frame, a conveyor belt generally deposits material 18 into feed hopper 12. When affixed to a chute, material 18 if fed directly into feed hopper 12 which dispenses it into funnel hopper 22. Funnel hopper 22 deposits material 18 through discharge opening 24 onto concave depression 42 of the rotating belt 26. Once material 18 contacts belt 26, a centrifugal force is created by the curved surface and the speed of rotation of belt 26 that material 18 is flung a significant distance from material slinger 10. The angle of the discharged material 18 can be adjusted by altering the position of the main body 14 in relation to feed hopper 12. This is accomplished with the use of the linear extendable actuators 52 as previously described. By pivoting main body 14 forward, as shown in FIG. 3, the angle of the material 18 is discharged upward in a more vertical angle. This can be used to eject material 18 over an embankment into a holding tank if desired. When main body 14 is pivoted backward, as shown in FIG. 5, material 18 is dispensed more horizontally. This can be used to eject material 18 underneath over hangs such as into a corner of the hold of a ship.

Although I have very specifically described the preferred structures of the present invention, it should be understood that the specific details are just that, "preferred" structures given for example to those skilled in the art. Many minor changes in the specific structures described may readily be made without departing from the scope of the invention, and therefore it should be understood that the scope of the invention is not to be limited by the specification and drawings given for example, but is to be determined by the intended spirit and scope of the appended claims.

What I claim as my invention is:

1. An apparatus for throwing bulk material comprising an upper section having a feed hopper for receiving bulk material, a main body pivotally attached to said upper section, said main body including frame means and a funnel hopper supported by said frame means so as to receive bulk material from said feed hopper, belt support means rotatably supported on said frame means, an endless throwing belt trained over said belt support means and positioned at least in part to receive bulk material from said funnel hopper, rotatable idler wheel means supported on said frame means, said idler wheel means engaging an upper surface of said belt to form said belt into a material receiving depression beneath said funnel hopper, first powered means connected to said belt support means having means to rotate said belt, second powered means connected between said upper section and said main body with said second powered means positioned adjacent the pivotal attachment of said main body to said upper section, said second powered means having means to cause pivoting and thus angular change between said upper section and said main body for rendering a trajectory change in bulk material throwing, an opening positioned between said upper section and said main body with said opening providing means for relieving air pressures and vacuums within a material flow path.

2. An apparatus for throwing bulk material, comprising an upper section having a feed hopper for receiving bulk material, a frame means pivotally attached to said upper section, a funnel hopper supported by said frame means so as to receive bulk material from said feed hopper, an opening positioned between said feed hopper and said funnel hopper with said opening providing means for relieving air pressures and vacuums within a bulk material flow path, belt support means rotatably supported on said frame means, an endless throwing belt trained over said belt support means and positioned at least in part to receive bulk material from said funnel hopper, rotatable idler wheel means supported on said frame means, said idler wheel means engaging an upper surface of said belt to form said belt into a material receiving depression beneath said funnel hopper, first powered means connected to said belt support means having means to rotate said belt, second powered means connected between said upper section and said frame means and having means to cause pivoting and thus angular change between said upper section and said frame means for rending a trajectory change in bulk material throwing.

3. An apparatus for throwing bulk material, comprising an upper section having a feed hopper for receiving bulk material, a frame means pivotally attached to said upper section, a funnel hopper supported by said frame means so as to receive bulk material from said feed hopper, an opening positioned between said feed hopper and said funnel hopper with said opening providing means for relieving air pressures and vacuums within a bulk material flow path, belt support means rotatably supported on said frame means, an endless throwing belt trained over said belt support means and positioned at least in part to receive bulk material from said funnel hopper, rotatable idler wheel means supported on said frame means, said idler wheel means engaging an upper surface of said belt to form said belt into a material receiving depression beneath said funnel hopper, first powered means connected to said belt support means having means to rotate said belt, second powered means connected between said upper section and said frame means and having means to cause pivoting and thus angular change between said upper section and said frame means for rending a trajectory change in bulk material throwing, said second powered means positioned adjacent the pivotal attachment of said frame means to said upper section.

* * * * *